(12) United States Patent
Suzuki

(10) Patent No.: US 8,766,624 B2
(45) Date of Patent: Jul. 1, 2014

(54) POSITION DETECTOR AND POSITION DETECTION METHOD

(71) Applicant: Wacom Co., Ltd., Saitama (JP)

(72) Inventor: Ken Suzuki, Saitama (JP)

(73) Assignee: Wacom Co,. Ltd., Saitama (JP)

( * ) Notice: Subject to any disclaimer, the term of this patent is extended or adjusted under 35 U.S.C. 154(b) by 118 days.

(21) Appl. No.: 13/665,502

(22) Filed: Oct. 31, 2012

(65) Prior Publication Data
US 2013/0141085 A1 Jun. 6, 2013

(30) Foreign Application Priority Data

Dec. 2, 2011 (JP) .................................. 2011-264871

(51) Int. Cl.
*G06F 3/041* (2006.01)
*G01R 31/26* (2014.01)

(52) U.S. Cl.
USPC .................. 324/207.17; 324/760.01; 345/173; 178/18.01

(58) Field of Classification Search
None
See application file for complete search history.

(56) References Cited

U.S. PATENT DOCUMENTS

| 6,498,590 | B1 | 12/2002 | Dietz et al. |
| 7,436,481 | B2 | 10/2008 | You et al. |
| RE41,731 | E | 9/2010 | Dietz et al. |
| 8,493,355 | B2 * | 7/2013 | Geaghan et al. ............... 345/174 |
| 2002/0185981 | A1 | 12/2002 | Dietz et al. |
| 2005/0052427 | A1 * | 3/2005 | Wu et al. ........................ 345/173 |

FOREIGN PATENT DOCUMENTS

| JP | 2003022158 A | 1/2003 |
| JP | 2004212973 A | 7/2004 |
| JP | 2011003034 A | 1/2011 |

* cited by examiner

*Primary Examiner* — Minh N Tang
(74) *Attorney, Agent, or Firm* — Seed IP Law Group PLLC

(57) ABSTRACT

In a position detector having two sensors, a first sensor detects a position indicated by a first indicator by electromagnetic induction and a second sensor detects a position indicated by a second indicator by a detection method other than electromagnetic induction. The position detector reduces adverse effects of the transmission signal supplied to the second sensor on the electromagnetic induction position detection circuit. The position indication state of the first and second indicators is determined based on a signal output from the first sensor according to the position indication by the first indicator on the first sensor and a signal output from the second sensor according to the position indication by the second indicator on the second sensor. According to the determination results of the position indication state, the level of the transmission signal provided to the second sensor to detect the position indication by the second indicator is controlled.

15 Claims, 11 Drawing Sheets

| TRANSMISSION SIGNAL LEVEL TO FIRST SENSOR | POSITION INDICATION STATE OF INDICATORS | | TRANSMISSION SIGNAL LEVEL TO SECOND SENSOR |
|---|---|---|---|
| | FIRST INDICATOR (ELECTROMAGNETIC INDUCTION) | SECOND INDICATOR (CAPACITIVE) | |
| FIXED (MEDIUM) | NO | YES | HIGH (EH) |
| | YES | NO | LOW (EL) |
| | YES | YES | MEDIUM (EM) |
| | NO | NO | LOW (EL) |

| TRANSMISSION SIGNAL LEVEL TO FIRST SENSOR | DETECTION POSITION INDICATION STATE OF INDICATORS | | TRANSMISSION SIGNAL LEVEL TO SECOND SENSOR |
|---|---|---|---|
| | FIRST INDICATOR (ELECTROMAGNETIC INDUCTION) | SECOND INDICATOR (CAPACITIVE) | |
| LOW | NO | YES | HIGH (EH) |
| HIGH | YES | NO | LOW (EL) |
| MEDIUM | YES | YES | MEDIUM (EM) |
| LOW | NO | NO | LOW (EL) |

FIG.11

| TRANSMISSION SIGNAL LEVEL TO FIRST SENSOR | DETECTION POSITION INDICATION STATE OF INDICATORS | | TRANSMISSION SIGNAL LEVEL TO SECOND SENSOR |
| --- | --- | --- | --- |
| | FIRST INDICATOR (ELECTROMAGNETIC INDUCTION) | SECOND INDICATOR (CAPACITIVE) | |
| LOW | NO | YES | FIXED (MEDIUM) |
| HIGH | YES | NO | |
| MEDIUM | YES | YES | |
| LOW | NO | NO | |

POSITION DETECTOR AND POSITION DETECTION METHOD

CROSS-REFERENCE(S) TO RELATED APPLICATION(S)

The present application claims priority under 35 U.S.C. 119(a) of Japanese Application No. 2011-264871, filed Dec. 2, 2011, the entire content of which is incorporated herein by reference.

TECHNICAL FIELD

The present invention relates to a position detector having a first sensor that detects a position indicated by a first indicator through electromagnetic induction and a second sensor that detects a position indicated by a second indicator through a detection method other than electromagnetic induction so that it can simultaneously detect the positions indicated by the first and second indicators.

BACKGROUND ART

Position detectors designed to detect the position indicated by an indicator such as a finger or a pen are known. A variety of position detection methods including resistance film method, electromagnetic induction method, and capacitance method are applicable for such position detectors.

Of those various types, electromagnetic induction position detectors include a sensor and a position indicator as an indicator as disclosed, for example, in Patent Document 1 (Japanese Patent Laid-Open No. 2004-212973). The position indicator is, for example, an electronic pen that generates an electromagnetic induction signal. The electromagnetic induction position detection sensor includes a number of thin and long loop coils arranged in the X- and Y-axis directions on a substrate. A position indicated by the position indicator is detected by detecting the electromagnetic induction signal from the position indicator with the loop coils on the substrate.

Electromagnetic induction position detectors permit input of a position with relatively high definition, thus making them widely popular.

On the other hand, as a position detection method for an indicator (e.g., a finger or a pen-type position indicator (a capacitive pen)) for devices such as touch panels, capacitive position detectors have been developed intensively in recent years. The capacitive type can be divided into two types, namely, surface capacitive type and projected capacitive type. Both types detect the position of the indicator by detecting the change in capacitive coupling between the sensor electrode and the indicator. A position detector based on a method called the cross point capacitance method, a method that has evolved from the projected capacitive method, has also been proposed (see, for example, Patent Document 2 (Japanese Patent Laid-Open No. 2011-3034)).

FIG. 14 illustrates an example of a sensor for a position detector based on cross point capacitance. The sensor of a cross point capacitance position detector includes a plurality of upper electrodes Ex arranged, for example, in the Y-axis (vertical) direction of the indication input surface and a plurality of lower electrodes Ey arranged, for example, in the X-axis (horizontal) direction, as illustrated in FIG. 14. The electrodes Ex and Ey are arranged at predetermined intervals and orthogonal to each other with a small spacing therebetween. In this case, predetermined capacitance Co (fixed capacitance) is formed at each of the intersections (cross points) of the electrodes Ex and the electrodes Ey.

Then, at a position where an indicator 100 such as a position indicator held by the user or a user's finger approaches or touches the indication input surface, capacitance Cf is formed between the indicator and the electrodes Ex and Ey at that position. The indicator 100 is connected to ground through the human body via given capacitance Cg. As a result, the charge between the upper and lower electrodes Ex and Ey at the position indicated by the indicator 100 changes because of the capacitances of Cf and Cg. A cross point capacitance position detector detects this change in charge, thereby identifying the position indicated by the indicator 100 on the indication input surface.

This change in charge is detected by a position detection circuit 101. The position detection circuit 101 uses, for example, the lower electrodes Ey as transmission electrodes and supplies a given transmission signal to one of the electrodes, and receives a reception signal from one of the upper electrodes Ex as reception electrodes, thus detecting the charge variation. The position detection circuit 101 switches the transmission electrode to be supplied with a transmission signal, and at the same time detects the change in current of the reception signal from the reception electrode, thus detecting the position indicated by the indicator.

PRIOR ART DOCUMENT

Patent Document

[Patent Document 1]
Japanese Patent Laid-Open No. 2004-212973
[Patent Document 2]
Japanese Patent Laid-Open No. 2011-3034

SUMMARY OF THE INVENTION

The indicator whose position is to be detected by the above electromagnetic induction position detection sensor is an electronic pen. On the other hand, the indicator whose position is to be detected by the capacitive position detection sensor is a finger or a capacitive pen. That is to say, the objects to be detected are different. For this reason, it is possible to consider incorporating two position detection sensors in a single position detector, one based on electromagnetic induction and the other based on capacitance. Such position detector can, for example, detect a position indicated by an electronic pen using the electromagnetic induction position detection sensor while at the same time detecting a position indicated by a finger using the capacitive position detection sensor. This makes it possible to carry out convenient operations such as using position indication by a finger to change the target to be controlled according to the position indication by the electronic pen.

Incidentally, an electromagnetic induction position detection circuit can detect a position indicated by an electronic pen by detecting an electromagnetic induction signal from the electronic pen with a sensor and by detecting the detection position. Therefore, even if an electromagnetic induction signal exchanged between the position indicator and the sensor is at a relatively low level, the position indicated by the electronic pen can be detected by the position detection circuit.

In contrast, a capacitive position detection circuit is designed to detect a change in current of the reception signal from the sensor's reception electrode at the position indicated by a finger or capacitive pen, as described above. Therefore, capacitive position detection circuits have a lower position detection sensitivity compared to electromagnetic induction position detection circuits. This requires that the level of transmission signals supplied to the sensor should be relatively large in capacitive position detection circuits. In order to further improve the capability to detect the position indicated by the indicator, the level of the transmission signal supplied to the sensor needs to be still further increased.

As a result, a position indicator having two position detection sensors, one based on electromagnetic induction and the other based on capacitance, so as to be capable of simultaneously detecting the positions indicated by indicators with the two sensors, may suffer adverse effects including jitter in the position detection signal obtained from the electromagnetic induction position detection circuit caused by the transmission signal supplied to the capacitive position detection sensor. Here, the term "jitter in the position detection signal" refers to the variation of the position detection signal obtained from the position detection circuit and failure of this signal to indicate the same position despite the fact that the same position is indicated by the indicator.

The above problem is not limited to the case in which the position detection sensor used in combination with an electromagnetic induction position detection sensor is a capacitive sensor. Instead, the above problem applies to all kinds of sensors in which the transmission signal supplied to the sensor may adversely affect the position detection signal obtained from an electromagnetic induction position detection circuit.

In light of the foregoing, according to one aspect of the present invention, adverse effects of the transmission signal supplied to a sensor based on a detection method other than electromagnetic induction on an electromagnetic induction position detection circuit are reduced in a position detector having two position detection sensors, one based on electromagnetic induction and the other based on a detection method other than electromagnetic induction so that it can simultaneously detect the positions indicated by indicators with the two sensors.

In order to solve the above problem, according to an embodiment of the present invention, a position detector is provided having a first sensor for detecting a position indicated by a first indicator through electromagnetic induction and a second sensor provided in proximity to the first sensor for detecting a position indicated by a second indicator through a detection method other than electromagnetic induction so as to be capable of simultaneously detecting the positions indicated by the first and second indicators. The position detector includes:

a signal supply circuit configured to supply a transmission signal used to detect the position indicated by the second indicator to the second sensor;

a position indication state determination circuit configured to be supplied with two signals, one output from the first sensor according to the position indicated by the first indicator and the other output from the second sensor according to the position indicated by the second indicator so as to determine the position indication state of the first and second indicators; and a signal level control circuit configured to control the level of the transmission signal supplied from the signal supply circuit to the second sensor according to the determination result of the position indication state by the position indication state determination circuit, wherein based on the position indication state determined by the position indication state determination circuit, if a transition occurs from a non-simultaneous state, in which one of the first and second indicators indicates a position non-simultaneously, to a simultaneous state in which both the first and second indicators indicate positions simultaneously with each other, the signal level control circuit supplies, to the second sensor, a transmission signal different in level from that supplied to the second sensor in the non-simultaneous state to detect the position indicated by the second indicator.

According to the configuration as described above, the position indication state determination circuit determines the position indication state of the first and second indicators based on the detection output of the position indicated by the first indicator from a first position detection circuit and the detection output of the position indicated by the second indicator from a second position detection circuit. Then, based on the position indication state determined by the position indication state determination circuit, if a transition occurs from the non-simultaneous state, in which one of the first and second indicators indicates a position non-simultaneously, to the simultaneous state in which both the first and second indicators indicate positions simultaneously with each other, the signal level control circuit supplies, to the second sensor, a transmission signal different in level from that supplied to the second sensor in the non-simultaneous state, thus controlling the level of the transmission signal supplied to the second sensor.

For example, when only position indication by the first indicator is being detected (in the "non-simultaneous state"), and thereafter position indication by the second indicator is detected and thus the position indication state shifts to the simultaneous state, or when only position indication by the second indicator is being detected and thereafter position indication by the first indicator is detected and thus the position indication state shifts to the simultaneous state, the signal level control circuit can exercise control in such a manner as to reduce the level of the transmission signal supplied to the second sensor. As a result, the aspect of the invention can alleviate the problems including the aggravation of the jitter performance of the position detection signal obtained from the electromagnetic induction position detection circuit.

Further, if a position indicated by the second indicator is detected but not a position indicated by the first indicator, the signal level control circuit can exercise control in such a manner as to increase the level of the transmission signal supplied to the second sensor. As a result, the second position detection circuit can detect the position indicated by the second indicator with a good S/N ratio from the signal output from the second sensor.

In a position detector having two position detection sensors, one based on electromagnetic induction and the other based on a detection method other than electromagnetic induction so as to be capable of simultaneously detecting positions indicated by the first and second indicators, an embodiment of the present invention alleviates adverse effects of the transmission signal supplied to the sensor based on the detection method other than electromagnetic induction on the electromagnetic induction position detection circuit. Further, an embodiment of the present invention enables detection of first and second indicators with a good S/N ratio according to the position indication state of the first and second indicators.

BRIEF DESCRIPTION OF THE DRAWINGS

FIG. 11 is a correspondence table used to describe operation of a fourth embodiment of the position detector according to the present invention.

DETAILED DESCRIPTION OF THE INVENTION

First Embodiment

Figure 1:
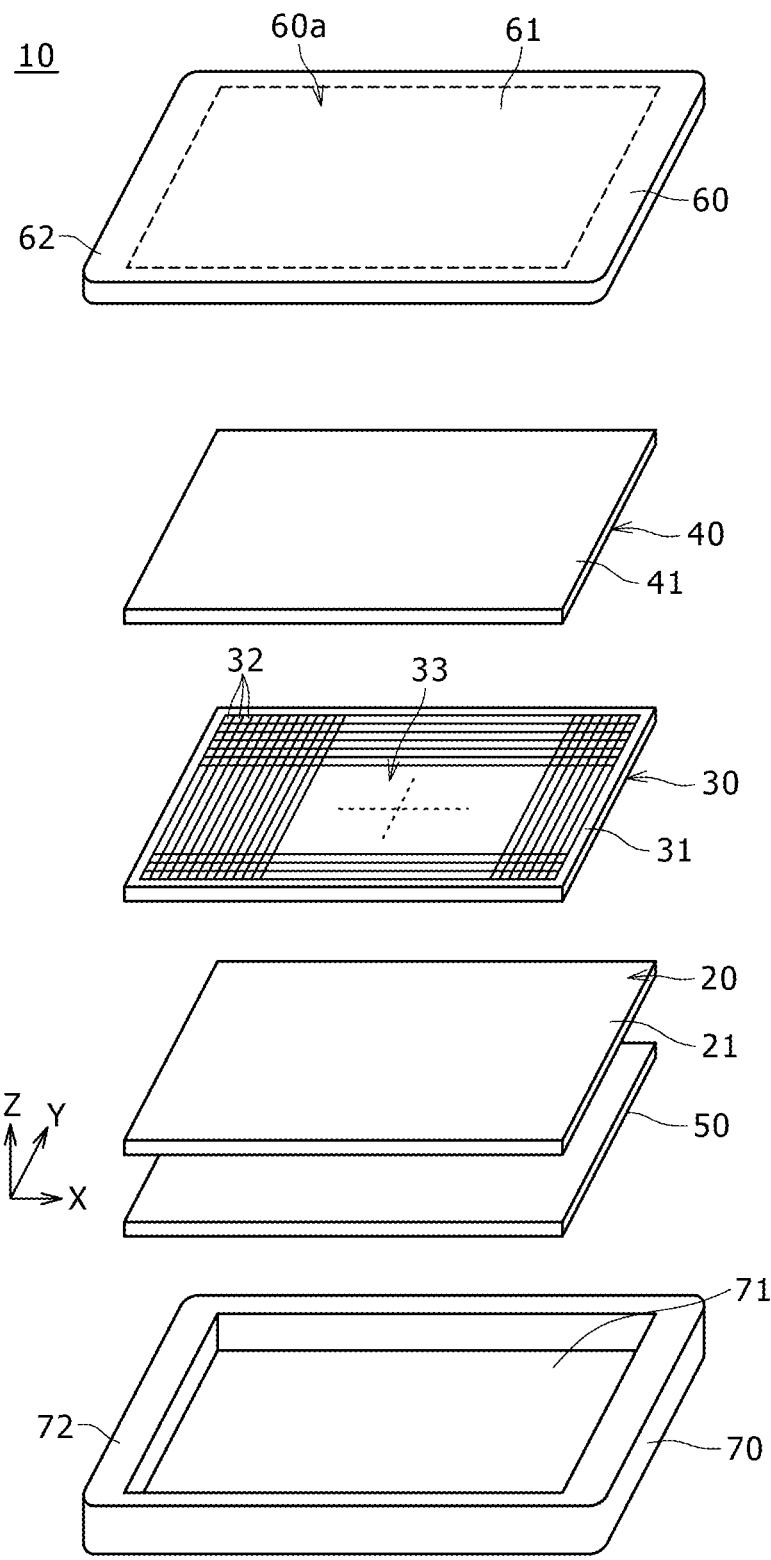
FIG. 1 is an exploded perspective view illustrating a configuration example of an electronic device to which an embodiment of a position detector according to the present invention is applied.

FIG. 1 is an exploded perspective view illustrating a configuration example of an electronic device incorporating a first embodiment of a position detector according to the present invention. In the example shown in FIG. 1, the electronic device is a pad type terminal that has not only the capability to detect the position indicated by an electromagnetic induction indicator, for example, a position indicator such as an electronic pen (hereinafter referred to as the first indicator) with an electromagnetic induction position detection sensor (hereinafter referred to as the first sensor), but also the capability to detect the position on the display screen of a display device indicated by an indicator such as a finger or a position indicator (a capacitive pen) (hereinafter referred to as the second indicator) with a capacitive position detection sensor (hereinafter referred to as the second sensor). The electronic device can simultaneously detect the positions indicated by the first and second indicators with the two sensors.

As an example of such pad type terminal, an electronic device 10 includes a first sensor 20 which is an electromagnetic induction position detection sensor, display device 30, second sensor 40 which is an capacitive position detection sensor, control circuit board 50, planar member 60 and enclosure 70.

The display device 30 is a flat display such as a liquid crystal or an organic EL display, and it has a display screen 33 in which a number of display pixels 32 are arranged in the X-axis direction (horizontal direction) and in the Y-axis direction (vertical direction) orthogonal to the X-axis direction on a display substrate 31. The first sensor 20 is arranged on the back side of the display screen 33 of the display device 30 in such a manner as to overlap the display device 30. Further, the second sensor 40 is arranged on the front side of the display screen 33 of the display device 30 in such a manner as to overlap the display screen 33 of the display device 30. Accordingly, the first and second sensors 20 and 40 are also arranged to overlap each other.

The detection area of the first sensor 20 in which a position indicated by the first indicator can be detected, the detection area of the second sensor 40 in which a position indicated by the second indicator can be detected, and the display area of the display screen 33 of the display device 30, are generally identical in size and arranged to overlap each other.

Although not shown in FIG. 1, an electromagnetic induction position detection circuit (first position detection circuit) is connected to the first sensor 20, and a capacitive position detection circuit (second position detection circuit) is connected to the second sensor 40. These first and second position detection circuits are provided on the control circuit board 50 and connected to the first and second sensors 20 and 40 by, for example, flexible cables. On the control circuit board 50, a microcomputer for controlling the electronic device 10, a display control circuit for the display device 30, other electronic components and a copper leaf wiring pattern are mounted.

The planar member 60 is made of a transparent material such as glass or resin. One side 60a of the planer member serves as an operation surface on which a position or positions are indicated by the first indicator such as an electronic pen and the second indicator such as a finger or an indication pen. The second sensor 40 and display device 30 are arranged on the other side of the planar member 60 opposite to the side 60a.

In this example, the planar member 60 has a shape slightly larger than the detection areas of the first and second sensors 20 and 40. That is, in the planar member 60 shown in FIG. 1, an area 61 enclosed by a dashed line corresponds to the detection areas of the indicators of the first and second sensors 20 and 40. A frame area 62 is formed around the area 61. Although not shown, the planar member 60 may be formed in such a manner that the frame area 62 is rendered opaque, for example by silk screen printing, and only the area 61 is transparent.

The enclosure 70 is made, for example, of a synthetic resin. A concave portion 71 is formed in the enclosure 70 to accommodate the first sensor 20, display device 30, second sensor 40 and control circuit board 50. After the first sensor 20, display device 30, second sensor 40 and control circuit board 50 are accommodated into the concave portion 71, the frame area 62 of the planar member 60 is attached to a frame area 72 of the enclosure 70, for example by an adhesive, thus sealing the concave portion 71 and assembling the electronic device 10.

Figure 2:
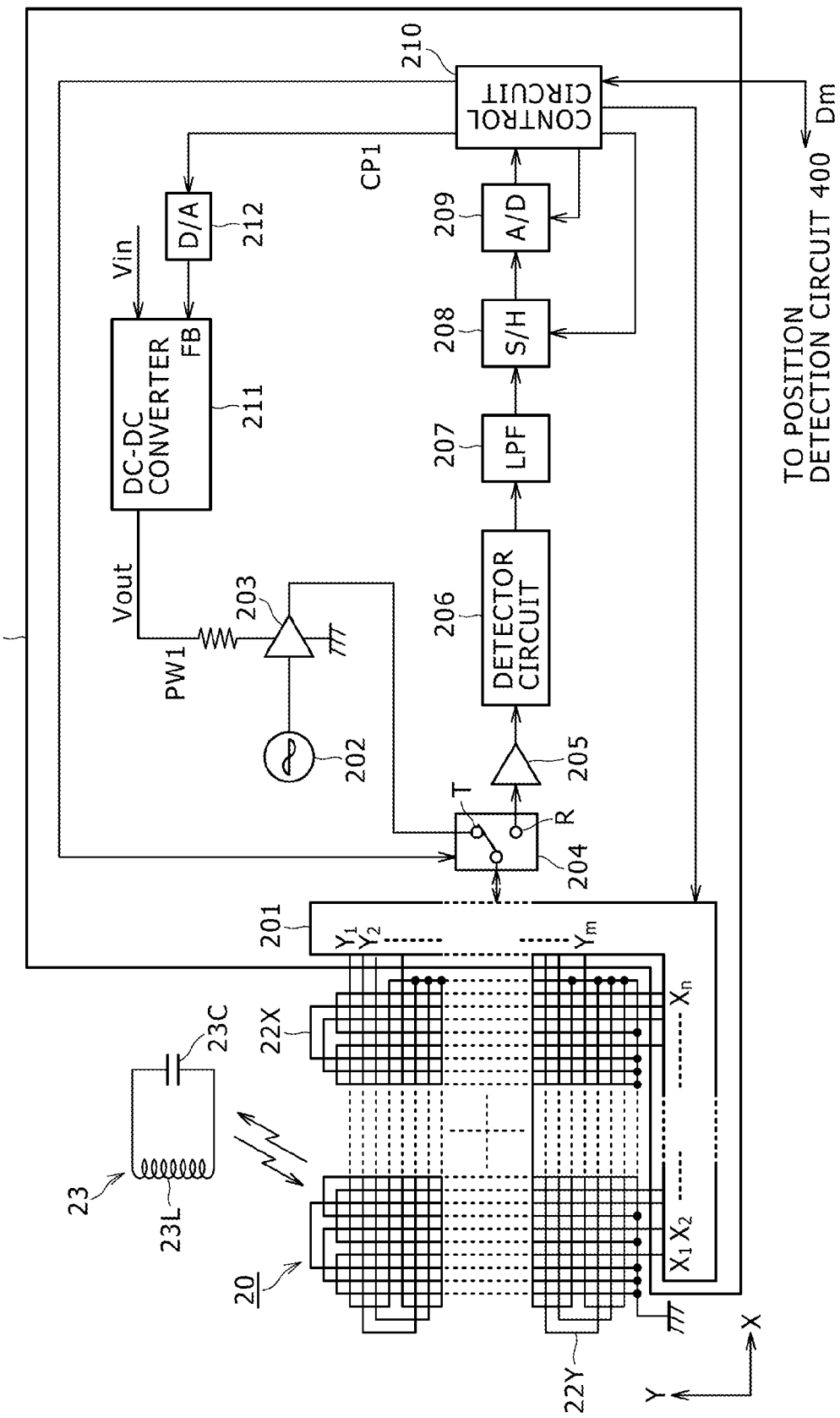
FIG. 2 is a block diagram illustrating part of the configuration of a signal processing section in the embodiment of the position detector according to the present invention.

Next, a description will be given of a configuration example of the first sensor 20 which is an electromagnetic induction sensor and a position detection circuit 200 thereof with reference to FIG. 2. An electronic pen 23 as an example of the first indicator used together with the first sensor 20 of this example incorporates a resonance circuit that includes a coil 23L and a capacitor 23C connected in parallel to the coil 23L.

The first sensor 20 includes an X-axis direction loop coil group 22X and Y-axis direction loop coil group 22Y. The X-axis direction loop coil group 22X is arranged on one side of a wiring board 21 (refer to FIG. 1). The Y-axis direction loop coil group 22Y is arranged on the other side of the wiring board 21. Each of the X-axis and Y-axis direction loop coil groups 22X and 22Y includes a plurality of rectangular loop coils. In this example, n loop coils are arranged in the X-axis direction, and m loop coils in the Y-axis direction. The loop coils of the X-axis and Y-axis direction loop coil groups 22X and 22Y are arranged overlapping each other.

The loop coils making up the X-axis direction loop coil group 22X are arranged equidistantly in the horizontal direction (X-axis direction) of the detection area for detecting the position indicated by the electronic pen 23 in such a manner as to sequentially overlap each other. On the other hand, the loop coils making up the Y-axis direction loop coil group 22Y are arranged equidistantly in the vertical direction (Y-axis direction) of the detection area in such a manner as to sequentially overlap each other.

The position detection circuit 200 is connected to the first sensor 20. The position detection circuit 200 includes a selector circuit 201, oscillator 202, current driver 203 that constitutes a transmission amplifier, transmission/reception switching circuit 204, reception amplifier 205, detector circuit 206, low-pass filter 207, sample-hold circuit 208, A/D (Analog to Digital) conversion circuit 209 and control circuit 210.

Further, the position detection circuit 200 includes a DC-DC converter 211 for controlling the source voltage supplied to the current driver 203 that constitutes the transmission amplifier. Control code CP1 output from the control circuit 210 is supplied to a control terminal FB of the DC-DC converter 211 via a D/A (Digital to Analog) conversion circuit 212. The control code CP1 is used to control the source voltage supplied to the current driver 203. The control code CP1 is converted into an analog value by the D/A conversion circuit 212 and supplied to the DC-DC converter 211.

The DC-DC converter 211 converts a DC input voltage Vin into a DC output voltage Vout according to the control code CP1 and supplies this voltage as a source voltage PW1 for the current driver 203. Then, the level of the electromagnetic induction signal supplied from the first sensor 20 to the electronic pen 23 is determined according to the source voltage PW1. The control code CP1 is set, based on the signal output from the first sensor 20 according to an electromagnetic induction signal from the electronic pen 23, to a value at which the position indicated by the electronic pen 23 can be detected by the position detection circuit 200 in such a manner that jitter is sufficiently suppressed.

The X- and Y-axis direction loop coil groups 22X and 22Y are connected to the selector circuit 201. The selector circuit 201 selects the loop coils of the X- and Y-axis direction loop coil groups one at a time in sequence according to control exercised by the control circuit 210.

The oscillator 202 generates an AC signal at a frequency f0. This AC signal is supplied to the current driver 203 for conversion into current, and then transmitted to the transmission/reception switching circuit 204. The transmission/reception switching circuit 204 switches the terminal from a transmission terminal T to a reception terminal R or vice versa to which the loop coil selected by the selector circuit 201 is connected every predetermined period of time according to control exercised by the control circuit 210. The current driver 203 is connected to the transmission terminal T, and the reception amplifier 205 is connected to the reception terminal R.

During transmission, therefore, an AC signal converted into current by the current driver 203 is supplied to the loop coil selected by the selector circuit 201 via the transmission terminal T of the transmission/reception switching circuit 204. During reception, on the other hand, an induced voltage generated by the loop coil selected by the selector circuit 201 is supplied to the reception amplifier 205 for amplification via the reception terminal R of the transmission/reception switching circuit 204 and transmitted to the detector circuit 206.

The induced voltage amplified by the reception amplifier 205 is detected by the detector circuit 206 and supplied to the A/D conversion circuit 209 via the low-pass filter 207 and sample-hold circuit 208. The A/D conversion circuit 209 converts the supplied analog signal into a digital signal, then supplying the resultant signal to the control circuit 210.

The control circuit 210 exercises control for position detection. That is, the control circuit 210 controls the selection of loop coils by the selector circuit 201, signal switching by the transmission/reception switching circuit 204, timings of the sample-hold circuit 208, and so on.

The control circuit 210 switches the connection of the transmission/reception switching circuit 204 to the transmission terminal T, thus energizing the loop coil selected from among those of the X-axis and Y-axis direction loop coil groups by the selector circuit 201 and transmitting an electromagnetic wave (electromagnetic induction signal). The resonance circuit of the electronic pen 23 stores energy by receiving the electromagnetic wave from the loop coil and acts in such a manner as to transmit an electromagnetic wave based on the stored energy to the first sensor 20.

Next, the control circuit 210 switches the connection of the transmission/reception switching circuit 204 to the reception terminal R. Induced voltage is generated in each of the loop coils of the X- and Y-axis direction loop coil groups 22X and 22Y by the electromagnetic wave transmitted from the electronic pen 23, that is, the position indicator.

The control circuit 210 calculates the coordinates of the indicated position in the X- and Y-axis directions in the detection area of the first sensor 20 based on the level of the induced voltage generated in each of the loop coils. Then, the control circuit 210 detects the position indicated by the electronic pen 23 from the calculated coordinates, thus controlling the screen to be displayed on the display device 30 according to the detection result.

Further, the control circuit 210 generates an indicator presence/absence signal (hereinafter referred to as the first indicator presence/absence signal) Dm indicating whether the electronic pen 23 is detected by the sensor 20 depending on whether the coordinates of the position indicated by the electronic pen 23 as the first indicator have been calculated. The signal Dm is supplied to a control circuit 410 of a position detection circuit 400 of the second sensor 40 as described later.

Next, a description will be given of a configuration example of the position detection circuit 400 and the second sensor 40 with reference to FIG. 3. In this example, the second sensor 40 has the configuration of a cross point capacitance sensor so that it can simultaneously detect multiple touches by a plurality of fingers.

The sensor 40 includes, for example, a transparent electrode group made up of a plurality of optically transmissive electrodes formed on one side of a transparent substrate 41 (i.e., the side opposite to the side facing the display screen 33 of the display device 30). The transparent substrate 41 is made of, for example, a glass or resin film substrate.

The transparent electrode group includes a plurality of first transparent electrodes 42X formed in the Y-axis direction and a plurality of second transparent electrodes 42Y formed in the X-axis direction. The second transparent electrodes 42Y are orthogonal to the first transparent electrodes 42X. The first transparent electrodes 42X are arranged in the X-axis direction at predetermined intervals. On the other hand, the second transparent electrodes 42Y are arranged in the Y-axis direction at predetermined intervals. The first and second transparent electrodes 42X and 42Y are made of an optically transmissive conductive material such as ITO film conductor.

In this example, the first and second transparent electrodes 42X and 42Y are formed on the same side of the transparent substrate 41. Therefore, in each of the cross point areas where one of the first transparent electrodes 42X and one of the second transparent electrodes 42Y orthogonal thereto intersect, an insulator is provided between the first and second transparent electrodes 42X and 42Y for electrical insulation.

The position detection circuit 400 is connected to the second sensor 40. The position detection circuit 400 includes a transmission signal generation circuit 401, transmission electrode selector circuit 402, transmission signal amplification circuit 403, reception electrode selector circuit 404, reception signal processing circuit 405, position information output circuit 406, and the control circuit 410.

Figure 3:
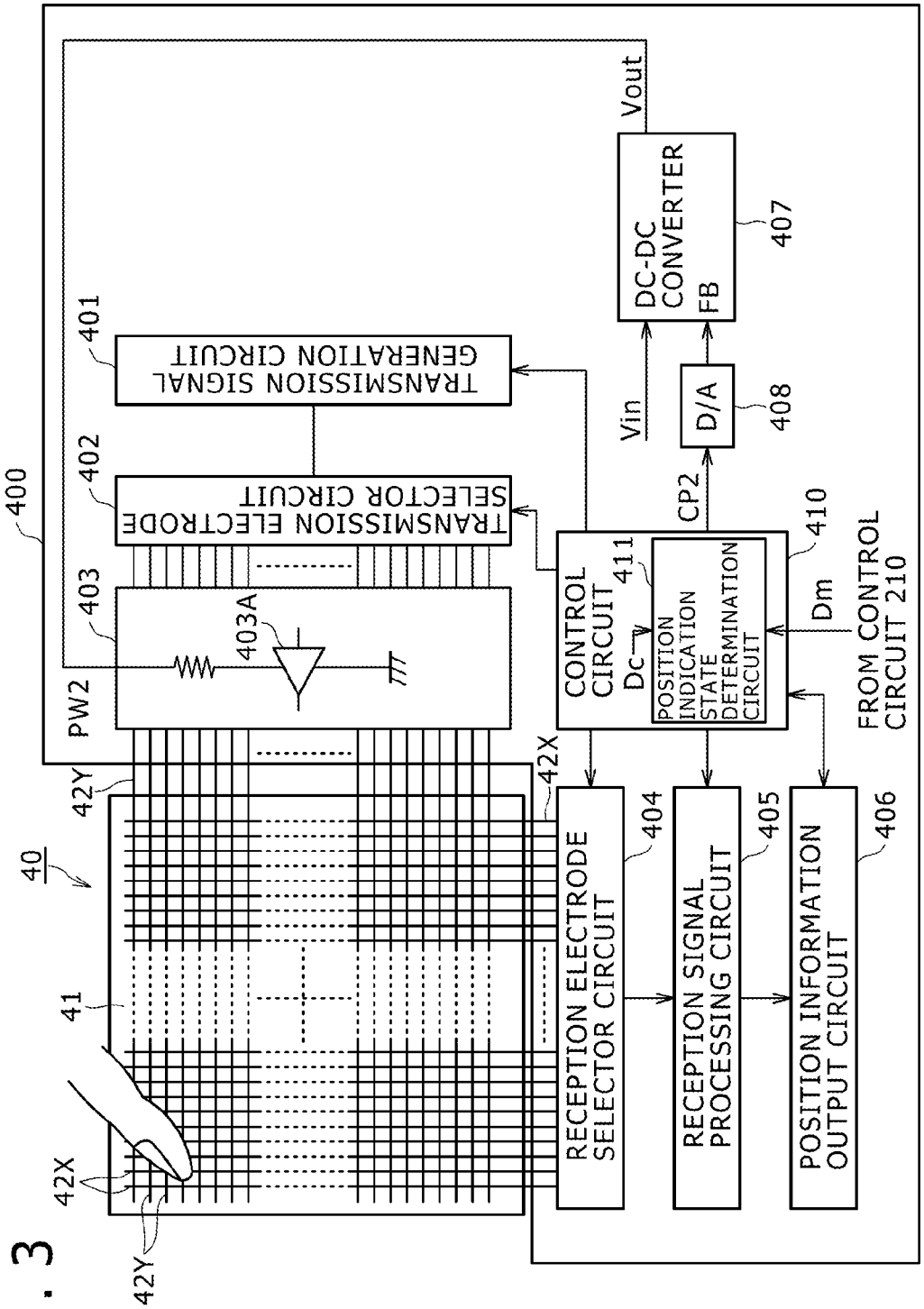
FIG. 3 is a block diagram illustrating part of the configuration of the signal processing section in the embodiment of the position detector according to the present invention.

For reasons of convenience, the transmission signal amplification circuit 403 is illustrated in FIG. 3 to include a single transmission amplifier 403A. In practice, however, the transmission amplifier 403A is provided for each of the plurality of second transparent electrodes 42Y, and the transmission signal amplification circuit 403 includes a plurality of transmission amplifiers 403A.

Further, the position detection circuit 400 includes a DC-DC converter 407 for controlling the source voltage supplied to the transmission signal amplification circuit 403. Control code CP2 output from the control circuit 410 via a D/A conversion circuit 408 is supplied to the control terminal FB of the DC-DC converter 407. The control code CP2 is used to control the source voltage supplied to the second sensor 40 such that the voltage is supplied at a determined level. The control code CP2 is converted into an analog value by the D/A conversion circuit 408. The control code CP2 sets the level of the transmission signal supplied from the transmission amplifier 403A to the second sensor 40. The transmission amplifier 403A will be described later.

The DC-DC converter 407 converts a DC input voltage Vin fed thereto into a DC output voltage Vout according to the control code CP2. The DC output voltage Vout is supplied as a source voltage PW2 to each of the plurality of transmission amplifiers 403A of the transmission signal amplification circuit 403.

In the first embodiment, the control circuit 410 includes a position indication state determination circuit 411. The circuit 411 determines the position indication state of the first indicator (electronic pen 23) and the second indicator (a position indicator such as a finger or a capacitive pen) of the position detector incorporated in the electronic device 10.

Then, the control circuit 410 controls and varies the control code CP2 supplied to the DC-DC converter 407 through the D/A conversion circuit 408 according to the determination result of the position indication state determination circuit 411. Therefore, the source voltage PW2 supplied to the plurality of transmission amplifiers 403A of the transmission signal amplification circuit 403 is controlled and varied according to the position indication state of the first and second indicators, thus setting the level of the transmission signal supplied to the second sensor 40 to a level corresponding to the varied source voltage PW2. The control for varying the transmission signal level will be described in detail later.

In the first embodiment, the position detection circuit 400 performs position detection in a discrete manner at predetermined time intervals such as every 10 msec under control of the control circuit 410, thus detecting each of the positions indicated by the second indicator on the second sensor 40 and providing the detection result of each of the positions.

The transmission signal generation circuit 401 and transmission electrode selector circuit 402 make up a transmission signal supply circuit, and the reception electrode selector circuit 404 and reception signal processing circuit 405 make up a signal reception circuit. In this example, the first transparent electrodes 42X serve as reception electrodes whereas the second transparent electrodes 42Y serve as transmission electrodes.

The transmission signal generation circuit 401 supplies a predetermined transmission signal to the transmission electrode selector circuit 402 at predetermined timings under control of the control circuit 410. For example, an orthogonal spreading code can be used as the predetermined transmission signal (see, for example, Japanese Patent Laid-Open No. 2003-22158).

The transmission electrode selector circuit 402 selects a determined second transparent electrode 42Y under selection control of the control circuit 410. A transmission signal is supplied from the transmission signal generation circuit 401 to the second transparent electrode 42Y selected by the transmission electrode selector circuit 402 via the transmission amplifier 403A in the transmission signal amplification circuit 403.

The reception electrode selector circuit 404 selects the first transparent electrodes 42X sequentially under control of the control circuit 410, and the reception signal from the selected first transparent electrode 42X is supplied to the reception signal processing circuit 405.

The reception signal processing circuit 405 detects, under control of the control circuit 410, the change in reception signal caused by a position indicating operation on the second sensor 40 by the second indicator such as a finger or a position indicator. The detection output is supplied to the position information output circuit 406.

The position information output circuit 406 generates, under control of the control circuit 410, based on the detection output of the reception signal processing circuit 405, and the first transparent electrode 42X in which a signal change has occurred and the transparent electrode 42Y to which a transmission signal is supplied at that time, a coordinate output which is an indicated position detection signal corresponding to the position indicated by the second indicator such as a finger or a position indicator. The coordinate output generated as the result of position detection is output to the control circuit 410.

On reception of the coordinate output of the position detection result from the position information output circuit 406, the control circuit 410 detects the position indicated by the second indicator and any movement operation (e.g., a gesture operation), thus controlling the screen displayed on the display device 30 according to the detection result. Further, the control circuit 410 generates an indicator presence/absence signal (hereinafter referred to as the second indicator presence/absence signal) Dc indicating whether the position indicated by the second indicator is detected by the second sensor 40 depending on whether the coordinates of the position indicated by the finger or a position indicator as the second indicator have been calculated. Then, the control circuit 410 outputs the generated second indicator presence/absence signal Dc to its position indication state determination circuit 411.

As described above, the position detector according to the present embodiment includes the electromagnetic induction first sensor 20 provided with the position detection circuit 200 and the capacitive second sensor 40 provided with the position detection circuit 400, and is capable of simultaneously detecting the position indicated by the first indictor (e.g., electronic pen) and that indicated by the second indicator (e.g., finger or position indicator). This makes it possible for the electronic device 10 to change the image displayed on the display device 30 according to the detection results of the first and second indicators.

[Controlling the Level of the Transmission Signal to the Second Sensor 40]

The position detection circuit 400 according to the first embodiment alleviates adverse effects of the transmission signal supplied to the capacitive second sensor 40 on the position detection circuit 200 of the electromagnetic induction first sensor 20 by controlling the level of the transmission signal supplied to the second sensor 40 according to the position indication state determination result of the position indication state determination circuit 411.

That is, in the first embodiment, the second sensor 40 is arranged to overlap a liquid crystal display which is an example of the display device 30. The S/N ratio of the detection output of the second indicator produced using the second sensor 40 and position detection circuit 400 may degrade due to noise generated by this liquid crystal display. In the first embodiment, therefore, the level of the transmission signal supplied to the second sensor 40 is increased in order to improve S/N ratio of the detection output of the second indicator.

However, increasing the level of the transmission signal supplied to the second sensor 40 may lead to jitter in the position detection signal of the first indicator produced using the first sensor 20 and position detection circuit 200. In the present embodiment, therefore, the level of the transmission signal supplied to the second sensor 40 is controlled according to the position indication state of the first and second indicators rather than maintaining the level of the transmission signal supplied to the second sensor 40 high at all times.

As described earlier, the control circuit 410 of the position detection circuit 400 connected to the second sensor 40 includes the position indication state determination circuit 411. The first indicator presence/absence signal Dm is supplied to the position indication state determination circuit 411 from the control circuit 210 of the position detection circuit 200 connected to the first sensor 20. The signal Dm indicates whether the position indicated by the electronic pen 23 as the first indicator is detected by the first sensor 20. Further, the position indication state determination circuit 411 obtains the second indicator presence/absence signal Dc generated by the control circuit 410.

Then, the position indication state determination circuit 411 determines the position indication state of the first and second indicators in the position detector from the first indicator presence/absence signal Dm supplied from the control circuit 210 and the second indicator presence/absence signal Dc. The control circuit 410 generates the control code CP2 corresponding to the determination result of the position indication state determination circuit 411, and supplies the control code CP2 to the DC-DC converter 407.

The DC-DC converter 407 converts the DC input voltage Vin into the DC output voltage Vout according to the control code CP2 and supplies the voltage Vout to the transmission amplifiers 403A of the transmission signal amplification circuit 403 as the source voltage PW2. This brings the transmission signal supplied to the second transparent electrodes 42Y of the second sensor to a level controlled according to the determination result of the position indication state determination circuit 411.

Figures 4, 5:
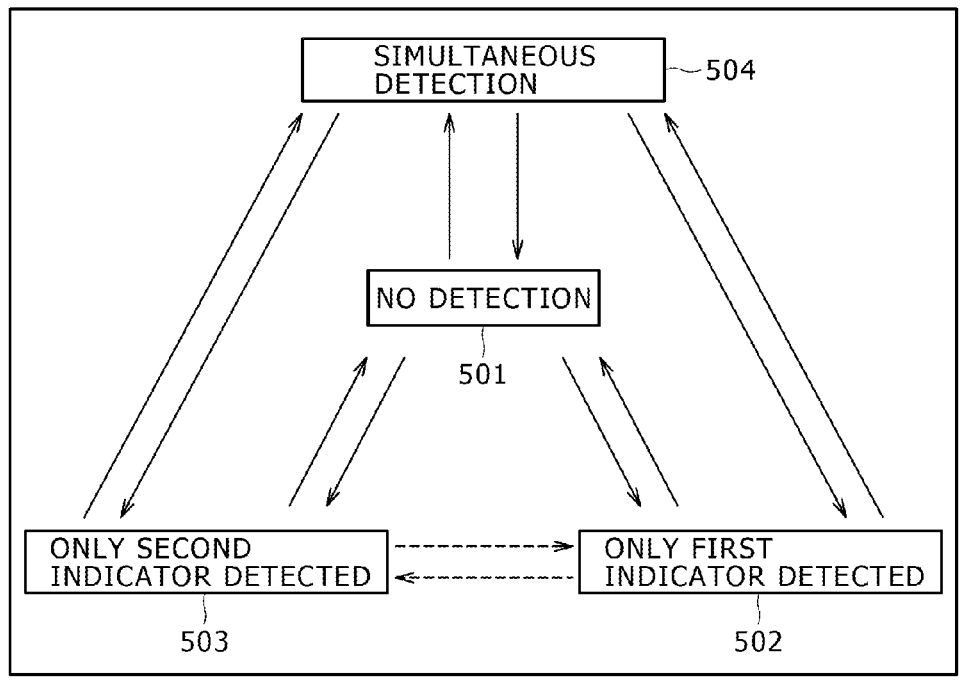
FIG. 4 is a transition diagram of the position indication state of first and second indicators in the embodiment of the position detector according to the present invention.
FIG. 5 is a correspondence table used to describe operation of a first embodiment of the position detector according to the present invention.

FIG. 4 illustrates a transition diagram of the position indication state of the first and second indicators in the position detector according to the first embodiment. FIG. 5 illustrates a correspondence table between the position indication state of the first and second indicators and the magnitudes of the levels of the transmission signal supplied to the first sensor and the second sensor in the first embodiment.

That is, as illustrated in the transition diagram of FIG. 4, there are four different position indication states of the first and second indicators, namely, a state 501 in which neither the first indicator nor the second indicator is detected, a state 502 in which only the first indicator is detected, a state 503 in which only the second indicator is detected, and a state 504 in which the first and second indicators are simultaneously detected. As illustrated by arrows in FIG. 4, transitions occur between these states.

Incidentally, the transition arrows are shown by dashed lines between the state 502, in which only the first indicator is detected, and the state 503, in which only the second indicator is detected, in consideration of the fact that transitions between the states 502 and 503 commonly take place by way of the state 501 in which no indicators are detected, or the state 504 in which both of the indicators are simultaneously detected, and that direct transitions between the states 502 and 503 rarely take place.

The level of the transmission signal supplied to the second sensor 40 is controlled as illustrated in FIG. 5 according to the position indication state of the first and second indicators, which transitions as described in FIG. 4.

That is, the transmission signal supplied to the second sensor 40 is set to a low level EL when the position indication is in the state 501 in which neither the first indicator nor the second indicator is detected or in the state 502 in which only the first indicator is detected. Further, the transmission signal supplied to the second sensor 40 is set to a high level EH when the position indication is in the state 503 in which only the second indicator is detected. Still further, the transmission signal supplied to the second sensor 40 is set to a medium level EM between the low level EL and high level EH when the position indication is in the state 504 in which the first and second indicators are simultaneously detected.

Incidentally, each of the signal levels listed in the column "Transmission signal level to 2nd sensor" in FIG. 5 is set by the control code CP2 transmitted from the control circuit 410 to control the DC-DC converter 407.

Here, the high level EH of the transmission signal level shown in FIG. 5 is a level that allows the capacitive second sensor 40 and position detection circuit 400 to detect the position indicated by the second indicator with a good S/N ratio. The source voltage PW2 supplied at this time from the DC-DC converter 407 to the transmission signal amplification circuit 403 is controlled, for example, to a voltage of about 12 to 24 V.

Further, the medium level EM of the transmission signal level is a level that can alleviate jitter in the position detection signal of the electromagnetic induction first sensor 20 and position detection circuit 200 while at the same time allowing the capacitive second sensor 40 and position detection circuit 400 to properly detect the position indicated by the second indicator. The source voltage PW2 supplied at this time from the DC-DC converter 407 to the transmission signal amplification circuit 403 is controlled, for example, to a voltage of about 3.3 to 5 V.

Still further, the low level EL of the transmission signal level is a level that allows the capacitive second sensor 40 and position detection circuit 400 to properly detect the position indicated by the second indicator and keeps jitter in the position detection signal of the electromagnetic induction first sensor 20 and position detection circuit 200 to a minimum. The source voltage PW2 supplied at this time to the transmission signal amplification circuit 403 is controlled, for example, to about 3.3 V.

It should be noted that the magnitude relation between the three signal levels EH, EM and EL is EH>EM≥EL in the above example.

In the example shown in FIG. 5, on the other hand, the transmission signal supplied from the position detection circuit 200 to the first sensor 20 (AC signal for transmitting an electromagnetic induction signal to the electronic pen 23) is set to a fixed level that allows the first sensor 20 and position detection circuit 200 to properly detect the position indicated by the first indicator. In the example shown in FIG. 5, the transmission signal supplied to the first sensor 20 is set to the medium level in relation to the description given later with reference to FIGS. 7 and 11. Incidentally, the level of the transmission signal to the first sensor 20 may be variable as described later.

Next, a description will be given of an example of processing operation for controlling the transmission signal level by the control circuit 410 in the position detection circuit 400 including the capability of the position indication state determination circuit 411 with reference to the flowchart shown in FIG. 6.

That is, the position indication state determination circuit 411 of the control circuit 410 monitors two signals, namely, the second indicator presence/absence signal Dc generated by the position information output circuit 406 from the coordinate output of the second sensor 40 and the first indicator presence/absence signal Dm supplied from the control circuit 210 of the position detection circuit 200. The position indication state determination circuit 411 first determines whether the second indicator is detected (state 503 or 504) based on the second indicator presence/absence signal Dc (step S101).

When it is determined in step S101 that the second indicator is not detected (state 501 or 502), the control circuit 410 controls the DC-DC converter 407 according to the control code CP2 to set the transmission signal supplied to the second sensor 40 to the low level EL (step S102). Then, the control circuit 410 returns the process to step S101 to repeat step S101 and the subsequent steps.

On the other hand, when it is determined in step S101 that the second indicator is detected (state 503 or 504), the position indication state determination circuit 411 of the control circuit 410 determines based on the first indicator presence/absence signal Dm whether not only the second indicator but also the first indicator is detected (state 504) (step S103). When it is determined in step S103 that both the first and second indicators are simultaneously detected (state 504), the control circuit 410 outputs, to the DC-DC converter 407 via the D/A conversion circuit 408, such control code CP2 that sets the transmission signal supplied to the second sensor 40 to the medium level EM (step S104). Then, the control circuit 410 returns the process to step S101 to repeat step S101 and the subsequent steps.

On the other hand, when it is determined in step S103 that the second indicator is detected but the first indicator is not detected (state 503), the control circuit 410 outputs, to the DC-DC converter 407 via the D/A conversion circuit 408, such control code CP2 that sets the transmission signal to the high level EH (step S105). Then, the control circuit 410 returns the process to step S101 to repeat step S101 and the subsequent steps.

Incidentally, the level of the transmission signal supplied to the second sensor 40 is controlled and varied so as to reach the post-transition level when one of the state transitions shown in FIG. 4 takes place. It is needless to say that if no state transition takes place, the signal level at that state is maintained.

Due to the above process routine, the level of the transmission signal supplied to the second sensor 40 is controlled according to the position indication state of the first and second indicators as shown in FIG. 5 in the first embodiment. This makes it possible to properly detect the positions indicated by the first and second indicators while at the same time alleviating adverse effects of the transmission signal supplied to the second sensor on the electromagnetic induction position detection circuit 200.

That is, the transmission signal supplied to the second sensor 40 is set to the low level EL when the second indicator is not detected by the second sensor 40, thus keeping jitter in the first indicator position detection signal of the first sensor 20 and position detection circuit 200 to a minimum.

On the other hand, even when the second indicator is detected by the second sensor 40, when the first indicator is detected by the first sensor 20, the transmission signal is controlled to the medium level EM which is lower than the high level EH for use when only the second indicator is detected. Thus, jitter in the first indicator position detection signal in the electromagnetic induction first sensor 20 and position detection circuit 200 can be alleviated.

Further, in the present embodiment, the transmission signal supplied to the second sensor 40 is set to the high level EH when the second indicator is detected by the second sensor 40 but the first indicator is not detected by the first sensor 20. This allows the second sensor 40 and position detection circuit 400 to detect the second indicator such as a finger with a good S/N ratio irrespective of noise generated from the display device.

Incidentally, because the level of the AC signal supplied to the first sensor 20 from the current driver 203 is fixed in the first embodiment, the source voltage at the fixed level may be supplied to the current driver 203 without going through (and without providing) the DC-DC converter 211.

Second Embodiment

In the first embodiment, the level of only the transmission signal supplied to the second sensor 40 is controlled to alleviate jitter in the electromagnetic induction first sensor 20 and position detection circuit 200.

However, it is possible to more effectively reduce adverse effects of the transmission signal supplied to the capacitive second sensor 40 on the electromagnetic induction position detection circuit 200 by controlling not only the level of the transmission signal supplied to the second sensor 40 but also the level of the electromagnetic induction signal supplied from the first sensor 20 to the electronic pen 23 as a position indicator constituting the first indicator.

The position indicator according to the second embodiment is identical in hardware configuration to the counterpart according to the first embodiment. Further, in the second embodiment, the control circuit 410 of the position detection circuit 400 controls the transmission signal level as in the first embodiment.

In the second embodiment, the control circuit 210 of the position detection circuit 200 in the first sensor 20 controls and varies the level of the transmission signal (AC signal) supplied to the first sensor 20 rather than maintaining the level fixed, in order to control and vary the level of the electromagnetic induction signal supplied to the electronic pen 23 from the first sensor 20. That is, although not shown, the control circuit 210 of the position detection circuit 200 shown in FIG. 2, for example, also includes a position indication state determination circuit. The second indicator presence/absence signal Dc is supplied to the position indication state determination circuit of the control circuit 210 from the control circuit 410 of the position detection circuit 400. Further, the first indicator presence/absence signal Dm generated by the control circuit 210 is also supplied to the position indication state determination circuit of the same circuit 210.

The position indication state determination circuit of the control circuit 210 determines the position indication state of the first and second indicators from the first and second indicator presence/absence signals Dm and Dc. Then, the control circuit 210 controls and varies the control code CP1 to be supplied to the DC-DC converter 211 via the D/A conversion circuit 212 according to the determination result of the position indication state determination circuit, thus controlling the level of the transmission signal (AC signal) supplied to the first sensor 20. The second embodiment is identical to the first embodiment in all other respects of the configuration.

Figures 6, 7:
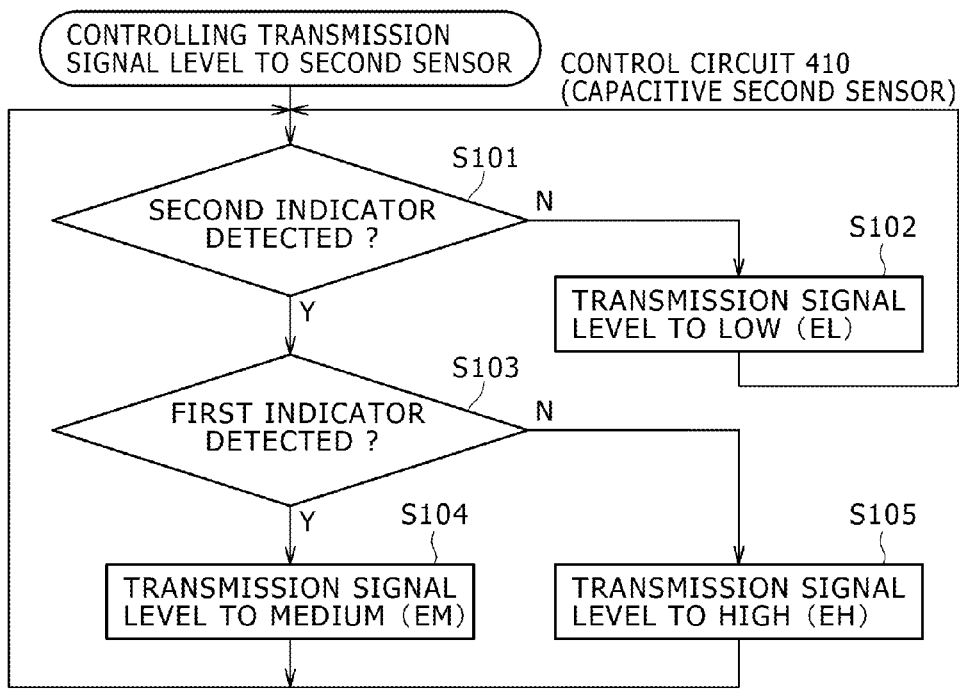
FIG. 6 is a flowchart for describing an example of processing operations of the major sections of the first embodiment of the position detector according to the present invention.
FIG. 7 is a correspondence table used to describe operation of a second embodiment of the position detector according to the present invention.

FIG. 7 is a correspondence table showing the position indication states of the first and second indicators, the magnitudes of the levels of the transmission signal supplied to the second sensor 40 and those of the levels of the transmission signal (AC signal) supplied to the first sensor 20.

In FIG. 7, the levels of the transmission signal supplied to the second sensor 40 for the position indication states of the first and second indicators are the same as those in FIG. 5 described above. FIG. 7 differs from FIG. 5 in that the magnitude of the level of the transmission signal supplied to the first sensor 20 is varied according to the position indication state of the first and second indicators instead of being maintained at a fixed level. In this example, the low level lower than the medium level and the high level higher than the medium level are used as the levels of the transmission signal supplied to the first sensor 20 in addition to the medium level set in FIG. 5.

That is, when the position indication is in the state in which the first indicator is not detected (state 503 in which only the second indicator is detected or state 501 in which neither the first indicator nor the second indicator is detected), the transmission signal supplied to the first sensor 20 is set to the low level which allows detection of the first indicator. Further, when the position indication is in the state 502 in which only the first indicator is detected, the transmission signal supplied to the first sensor 20 is set to the high level at which the first indicator can be detected while sufficiently avoiding adverse effects resulting from supply of the transmission signal to the second sensor 40. Still further, when the position indication is in the state 504 in which the first and second indicators are simultaneously detected, the transmission signal supplied to the first sensor 20 is set to the medium level between the low and high levels.

Figure 8:
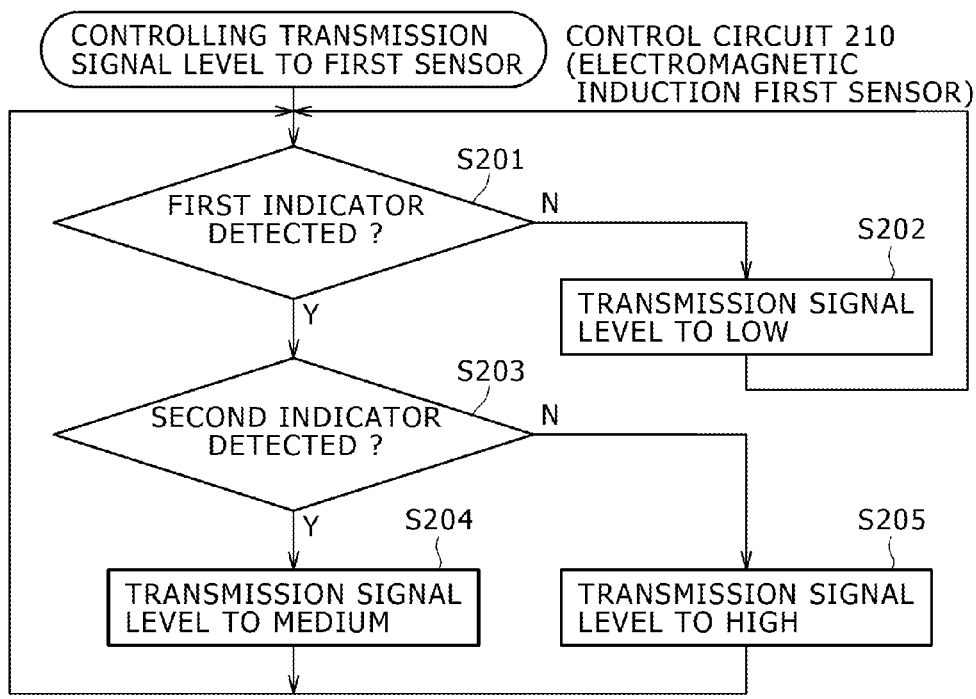
FIG. 8 is a flowchart for describing an example of processing operations of the major sections of the second embodiment of the position detector according to the present invention.

Next, a description will be given of an example of processing operation for controlling the transmission signal level when the control circuit 210 of the position detection circuit 200 has the capability of a position indication state determination circuit with reference to the flowchart shown in FIG. 8.

That is, the position indication state determination circuit of the control circuit 210 monitors the first and second indicator presence/absence signals Dm and Dc and first determines whether the first indicator is detected based on the first indicator presence/absence signal Dm (state 502 or 504) (step S201).

When it is determined in step S201 that the first indicator is not detected (state 501 or 503), the control circuit 210 controls the DC-DC converter 211 according to the control code CP1 to set the transmission signal supplied to the first sensor 20 to the low level (step S202). Then, the control circuit 210 returns the process to step S201 to repeat step S201 and the subsequent steps.

On the other hand, when it is determined in step S201 that the first indicator is detected (state 502 or 504), the position indication state determination circuit of the control circuit 210 determines whether the second indicator is detected in addition to the first indicator based on the second indicator presence/absence signal Dc (state 504) (step S203).

When it is determined in step S203 that the second indicator is detected in addition to the first indicator (state 504), the control circuit 210 controls the DC-DC converter 211 according to the control code CP1 to set the transmission signal supplied to the first sensor 20 to the medium level (step S204). Then, the control circuit 210 returns the process to step S201 to repeat step S201 and the subsequent steps.

On the other hand, when it is determined in step S203 that the first indicator is detected but the second indicator is not detected (state 502), the control circuit 210 controls the DC-DC converter 211 according to the control code CP1 to set the transmission signal supplied to the first sensor 20 to the high level (step S205). Then, the control circuit 210 returns the process to step S201 to repeat step S201 and the subsequent steps.

It should be noted that the level of the transmission signal supplied to the first sensor 20 is controlled and varied so as to reach the post-transition level when one of the state transitions shown in FIG. 4 takes place. It is needless to say that if no state transition takes place, the signal level in that state is maintained.

The second embodiment described above provides the same advantageous effect as the first embodiment. Further, the second embodiment controls not only the level of the transmission signal supplied to the second sensor 40 but also the level of the transmission signal supplied to the first sensor 20. The adverse effects of the transmission signal supplied to the second sensor on the electromagnetic induction position detection circuit 200 can therefore be more effectively alleviated.

That is, in the second embodiment, when only the first indicator is detected, the transmission signal supplied to the second sensor 40 is set to the low level and the transmission signal (AC signal) supplied to the first sensor 20 is set to the high level. This provides an advantageous effect of further alleviating adverse effects of the transmission signal supplied to the second sensor 40 on the electromagnetic induction position detection circuit 200.

Further, since the transmission signal (AC signal) supplied to the first sensor 20 is set to the high level, the first sensor 20 and position detection circuit 200 can detect the first indicator with a better S/N ratio.

Third Embodiment

The third embodiment is a modification example of the second embodiment. That is, in the second embodiment described above, the control circuit 210 of the position detection circuit 200 and the control circuit 410 of the position detection circuit 400 each includes the capability of a position indication state determination circuit, and they generate the control codes CP1 and CP2 separately.

In contrast, in the third embodiment, a control code generation circuit having a position indication state determination circuit is provided separately from the position detection circuits 200 and 400, thus reducing the processing burden on the control circuits 210 and 410.

Figure 9:
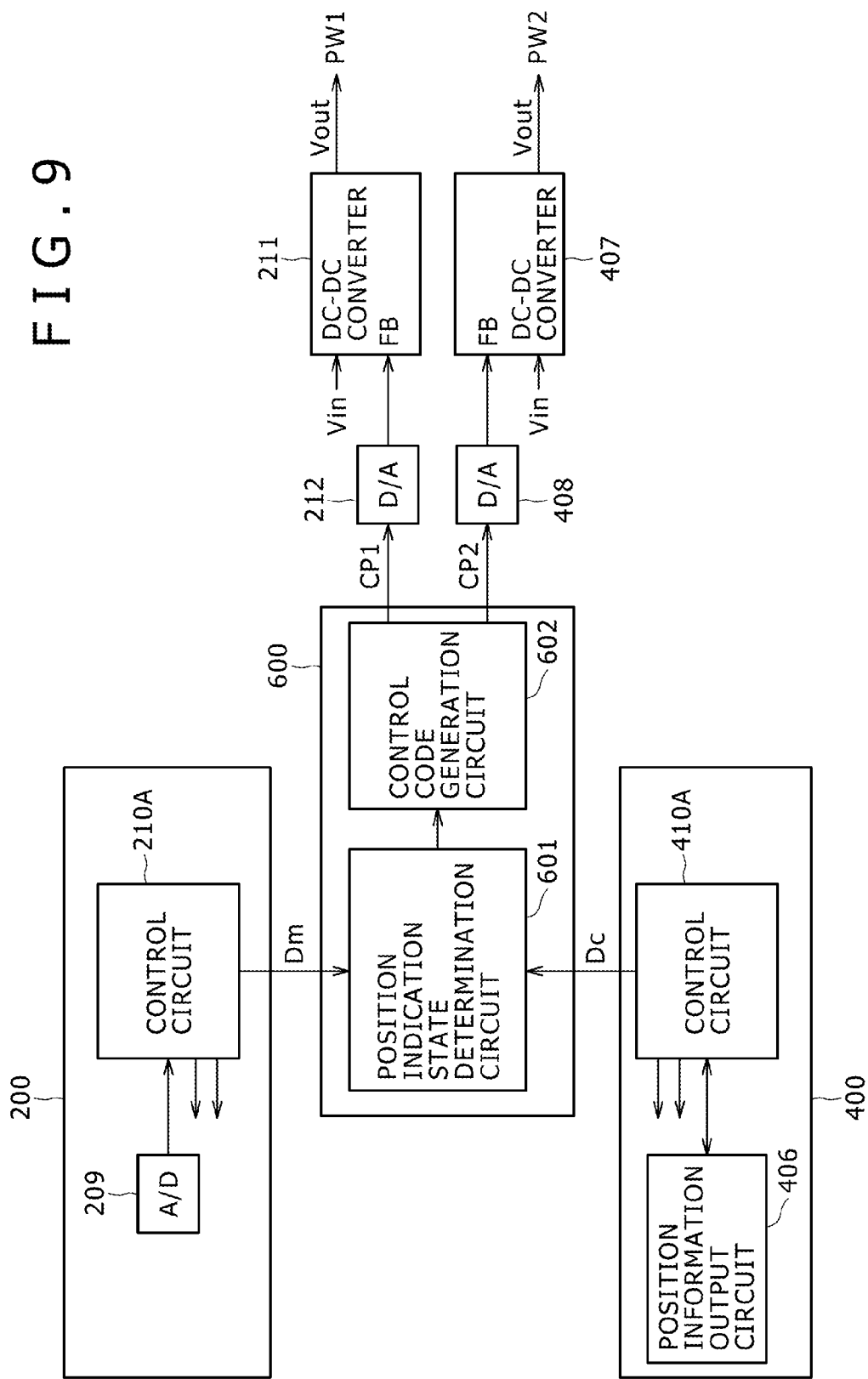
FIG. 9 is a block diagram illustrating a configuration example of major sections of a third embodiment of the position detector according to the present invention.

FIG. 9 illustrates major sections of a hardware configuration example of the position detection circuit of the electronic device 10 according to the third embodiment. The third embodiment is identical in configuration to the first and second embodiments described above except for the illustrated major sections.

That is, as illustrated in FIG. 9, a control circuit 210A of the position detection circuit 200 according to the third embodiment has the capability to generate the first indicator presence/absence signal Dm, but not the capability of a position indication state determination circuit or the capability to generate the control code CP1. On the other hand, a control circuit 410A of the position detection circuit 400 according to the third embodiment has the capability to generate the second indicator presence/absence signal Dc, but not the capability of a position indication state determination circuit or the capability to generate the control code CP2.

Then, the position detector according to the third embodiment has a control code generation circuit 600. The same circuit 600 includes a position indication state determination circuit 601 and control code generation circuit 602.

The first indicator presence/absence signal Dm is supplied to the position indication state determination circuit 601 from the control circuit 210A of the position detection circuit 200. In addition, the second indicator presence/absence signal Dc is supplied to the position indication state determination circuit 601 from the control circuit 410A of the position detection circuit 400. The position indication state determination circuit 601 determines the position indication state of the first and second indicators in the position detector of the electronic device 10 from the first and second indicator presence/absence signals Dm and Dc. The determination result is supplied to the control code generation circuit 602.

The control code generation circuit 602 generates the control codes CP1 and CP2 according to the determination result of the position indication state of the first and second indicators from the position indication state determination circuit 601. Then, the control code generation circuit 602 supplies the control code CP1 to the control terminal FB of the DC-DC converter 211 via the D/A conversion circuit 212, thus controlling the level of the transmission signal supplied to the first sensor 20. Further, the control code generation circuit 602 supplies the control code CP2 to the DC-DC converter 407 via the D/A conversion circuit 408, thus controlling the level of the transmission signal supplied to the second sensor 40.

Figure 10:
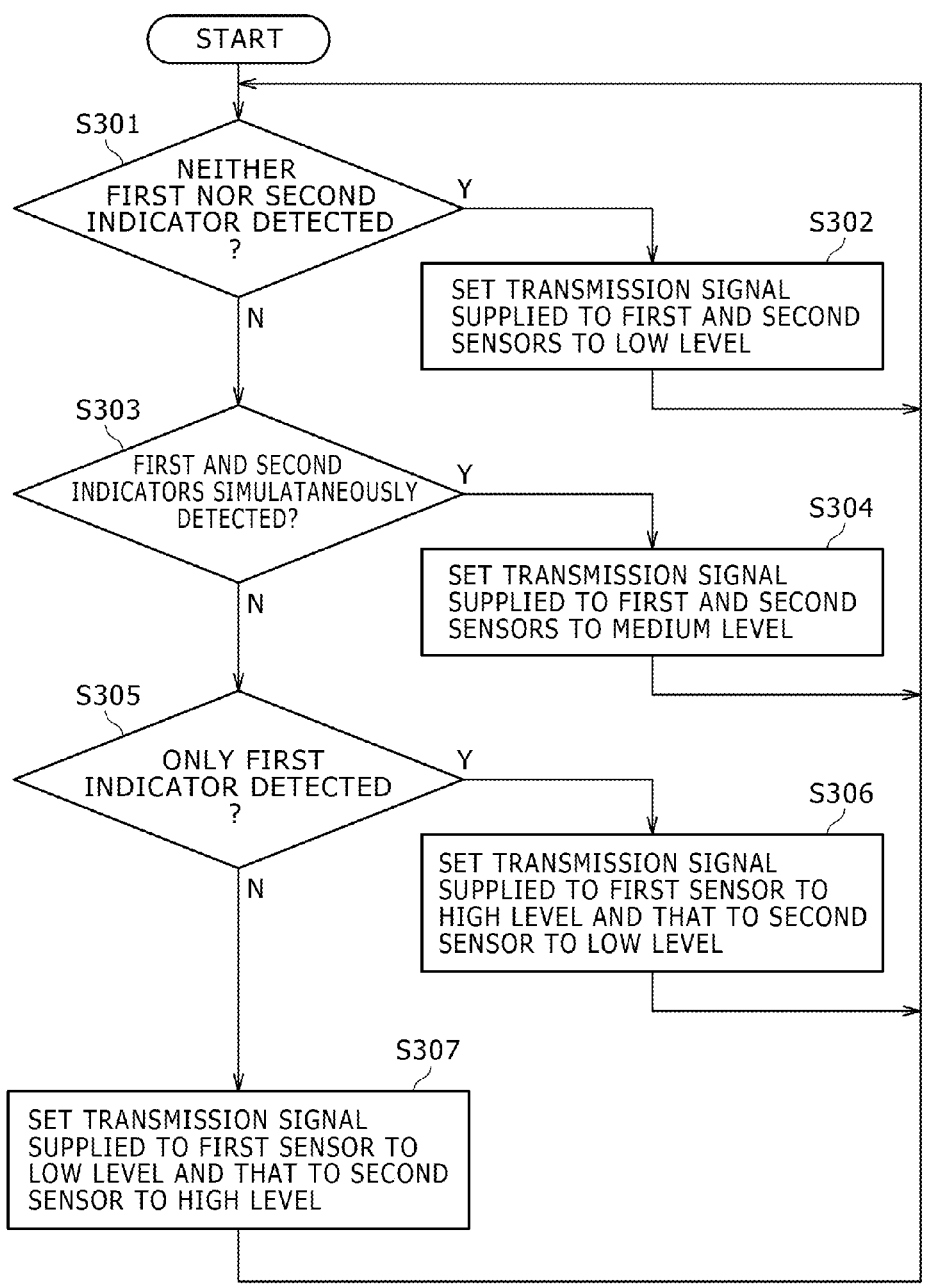
FIG. 10 is a flowchart for describing an example of processing operations of the major sections of the third embodiment of the position detector according to the present invention.

FIG. 10 illustrates a flowchart for an example of processing operation of the control code generation circuit 600.

The position indication state determination circuit 601 of the control code generation circuit 600 monitors the first and second indicator presence/absence signals Dm and Dc and determines whether the position indication is in the state 501 in which neither the first indicator nor the second indicator is detected (step S301). When it is determined in step S301 that the position indication is in the state 501, the control code generation circuit 602 generates such control code CP1 that sets the transmission signal supplied to the first sensor 20 to the low level, and outputs the code to the D/A conversion circuit 212. In addition, the same circuit 602 generates such control code CP2 that sets the transmission signal supplied to the second sensor 40 to the low level EL and outputs the code to the D/A conversion circuit 408 (step S302). Then, the control code generation circuit 600 returns the process to step S301 to repeat step S301 and the subsequent steps.

On the other hand, when it is determined in step S301 that the position indication is not in the state 501 in which neither the first indicator nor the second indicator is detected, the position indication state determination circuit 601 determines whether the position indication is in the state 504 in which the first and second indicators are simultaneously detected (step S303). When it is determined in step S303 that the position indication is in the state 504 in which the two indicators are simultaneously detected, the control code generation circuit 602 generates such control code CP1 that sets the transmission signal supplied to the first sensor 20 to the medium level, and outputs the code to the D/A conversion circuit 212. In addition, the same circuit 602 generates such control code CP2 that sets the transmission signal supplied to the second sensor 40 to the medium level EM and outputs the code to the D/A conversion circuit 408 (step S304). Then, the control code generation circuit 600 returns the process to step S301 to repeat step S301 and the subsequent steps.

On the other hand, when it is determined in step S303 that the position indication is not in the state 504 in which the two indicators are simultaneously detected, the position indication state determination circuit 601 determines whether the position indication is in the state 502 in which only the first indicator is detected (step S305). When it is determined in step S305 that the position indication is in the state 502 in which only the first indicator is detected, the control code generation circuit 602 generates such control code CP1 that sets the transmission signal supplied to the first sensor 20 to the high level, and outputs the code to the D/A conversion circuit 212. In addition, the same circuit 602 generates such control code CP2 that sets the transmission signal supplied to the second sensor 40 to the low level EL and outputs the code to the D/A conversion circuit 408 (step S306). Then, the control code generation circuit 600 returns the process to step S301 to repeat step S301 and the subsequent steps.

On the other hand, when it is determined in step S305 that the position indication is not in the state 502 in which only the first indicator is detected, but in the state 503 in which only the second indicator is detected, the control code generation circuit 602 generates such control code CP1 that sets the transmission signal supplied to the first sensor 20 to the low level, and outputs the code to the D/A conversion circuit 212. In addition, the same circuit 602 generates such control code CP2 that sets the transmission signal supplied to the second sensor 40 to the high level EH and outputs the code to the D/A conversion circuit 408 (step S307). Then, the control code generation circuit 600 returns the process to step S301 to repeat step S301 and the subsequent steps.

The third embodiment provides the same advantageous effect as the second embodiment.

Incidentally, in the third embodiment described above, the control codes CP1 and CP2 are generated by a single control code generation circuit, the circuit 602. However, two separate control code generation circuits, one configured to generate the control code CP1 and the other the control code CP2, may be provided instead of the control code generation circuit 602. In that case, the control code generation circuit configured to generate the control code CP1 can generate the control code CP1 by performing the processes shown in FIG. 8 according to the determination result from the position indication state determination circuit 601. Further, the control code generation circuit configured to generate the control code CP2 can generate the control code CP2 by performing the processes shown in FIG. 6 according to the determination result from the position indication state determination circuit 601.

Fourth Embodiment

In the first embodiment, the level of the transmission signal supplied to the second sensor 40 is controlled to lower levels so as to alleviate the aggravation of the jitter performance of the electromagnetic induction first sensor 20 and position detection circuit 200.

However, it is also possible to achieve the intended purpose of alleviating adverse effects of the transmission signal supplied to the second sensor on the detection of the first indicator by the first sensor and position detection circuit 200 by increasing the level of the electromagnetic induction signal supplied from the first sensor 20 to the electronic pen as a position indicator constituting the first indicator, instead of reducing the level of the transmission signal supplied to the second sensor 40.

The fourth embodiment is a position detector configured to increase the level of the electromagnetic induction signal, as described above. The fourth embodiment has the same hardware configuration as those shown in FIGS. 1 and 2. However, in the fourth embodiment, the control circuit 210 includes a position indication state determination circuit and supplies the first indicator presence/absence signal to that position indication state determination circuit. The control circuit 410 of the position detection circuit 400 supplies the second indicator presence/absence signal Dc to the position indication state determination circuit of the control circuit 210 of the position detection circuit 200. In the fourth embodiment, the control circuit 410 of the position detection circuit 400 does not have the capability of the position indication state determination circuit 411.

The position indication state determination circuit of the control circuit 210 determines the position indication state of the first and second indicators from the first and second indicator presence/absence signals Dm and Dc. Then, the control circuit 210 generates the control code CP1 according to the determination result of the position indication state determination circuit.

FIG. 11 illustrates a correspondence table between the position indication states of the first and second indicators and the magnitudes of the levels of the transmission signal supplied to the second sensor 40 and the transmission signal supplied to the first sensor 20. In the example shown in FIG. 11, a description will be given of a case in which the level of the transmission signals are controlled to one of the three levels, low, medium and high, as in FIGS. 5 and 7.

In the fourth embodiment, the transmission signal supplied to the second sensor 40 is fixed at the medium level that allows detection of the second indicator with a good S/N ratio irrespective of noise from the display device, as illustrated in FIG. 11.

In order to control the level of the electromagnetic induction signal supplied from the first sensor 20 to the electronic pen 23 as a position indicator constituting the first indicator, on the other hand, the level of the transmission signal supplied to the first sensor is controlled as illustrated in FIG. 11 in the fourth embodiment. That is, the transmission signal supplied to the first sensor 20 is set to the high level if the first indicator is detected but the second indicator is not detected. Further, the transmission signal is set to the medium level if the second indicator is detected in addition to the first indicator. Still further, the transmission signal supplied to the first sensor is set to the low level if the first indicator is not detected, irrespective of whether the second indicator is detected.

The fourth embodiment can also alleviate adverse effects of the transmission signal supplied to the capacitive second sensor 40 on the electromagnetic induction position detection circuit 200.

It should be noted that the display device 30 is provided in the electronic device 10, to which the position detector according to the first embodiment is applied. In order to ensure proper detection of the detection output from the second sensor 40 and position detection circuit 400 with a good S/N ratio irrespective of noise from the display device 30, the transmission signal supplied to the second sensor 40 is set to the medium level.

In an electronic device having the first and second sensors 20 and 40 arranged to overlap each other without a noise source such as a display device, however, there is no need to supply the transmission signal at the medium level to the second sensor 40 as in the first embodiment. In this case, therefore, the transmission signal supplied to the second sensor 40 shown in FIG. 11 may be set to the low level, but preferably to the medium level EM.

[Other Embodiments and Modification Examples]

The electromagnetic induction first sensor described above uses one of the two loop coil groups, one arranged in the X-axis direction and the other in the Y-axis direction, as coils for supplying the electromagnetic induction signal to the electronic pen. However, the electromagnetic induction first sensor is not limited to this type.

Figure 12:
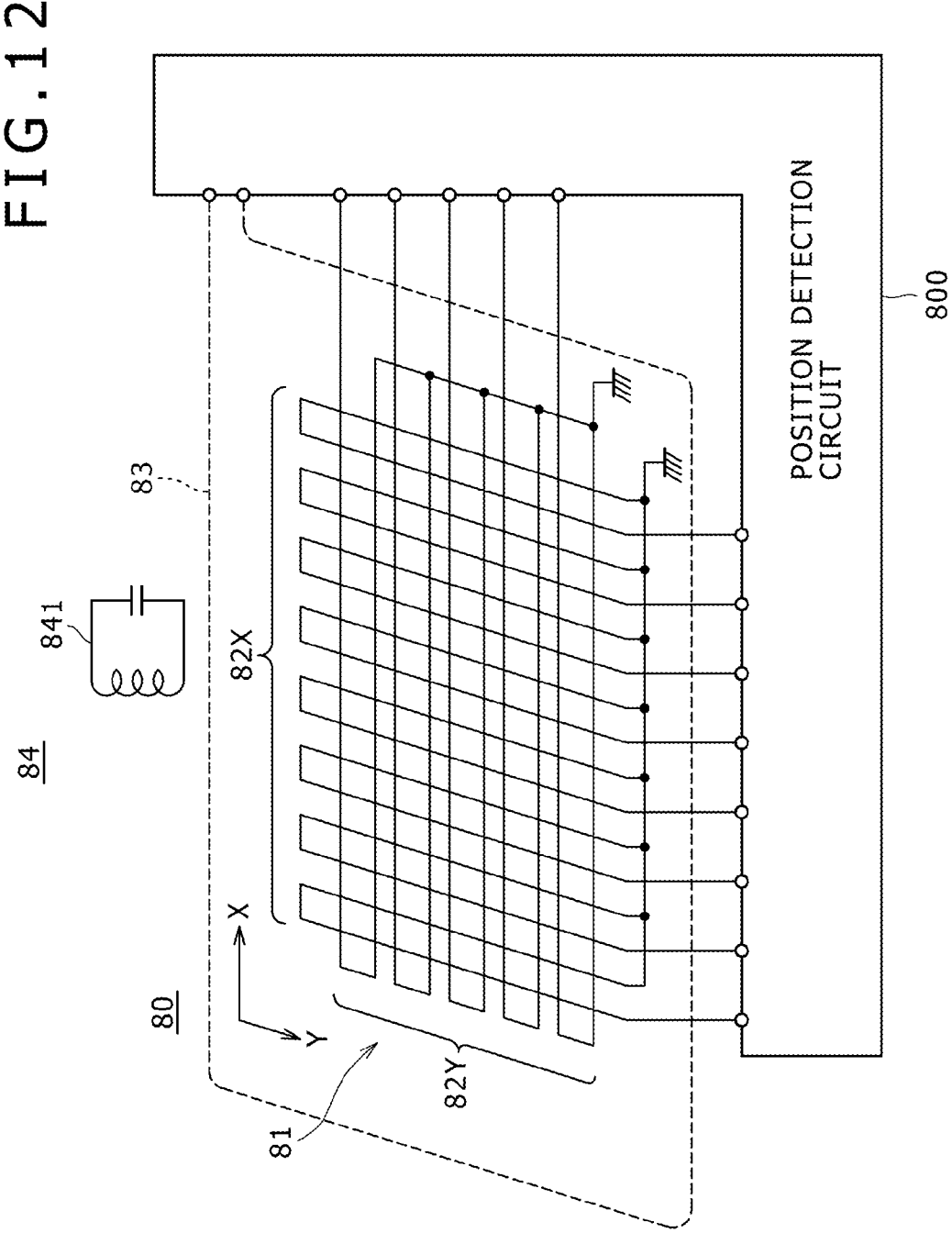
FIG. 12 is a diagram for describing another example of an electromagnetic induction sensor used in the position detector according to the present invention.

For example, an electromagnetic induction first sensor 80 as shown in FIG. 12 may be used. That is, in the example shown in FIG. 12, detection loop coils 82X and 82Y in a grid form arranged in the X- and Y-axis directions, respectively, are provided on one side of a detection coil board 81. A drive coil is arranged as a peripheral excitation coil 83 over the peripheral portion of the one or the other side of the detection coil board 81 to supply an electromagnetic induction signal to a position indicator (electronic pen) 84 constituting the first indicator.

A position detection circuit 800 supplies a signal at a predetermined frequency to the peripheral excitation coil 83. This generates an electromagnetic induction signal in the peripheral excitation coil 83, and an amount of energy corresponding to the electromagnetic induction signal is stored in a resonance circuit 841 of the position indicator (electronic pen) 84 serving as the first indicator. Then, the position indicator 84 supplies the magnetic energy stored in the resonance circuit 841 to the detection coil board 81 of the first sensor 80.

The position detection circuit 800 detects the position indicated by the position indicator 84 based on the signal received by the detection loop coils 82X and 82Y. That is, an induction current is generated in the detection loop coils 82X and 82Y according to the magnetic field generated by the resonance circuit 841 in the position indicator 84. The position detection circuit 800 determines the positions of the detection loop coils 82X and 82Y in which induction current has been generated while switching the detection loop coils 82X and 82Y, thus calculating the position indicated by the position indicator 84 from the determination result and outputting the calculated position.

In the case of the electromagnetic induction first sensor shown in FIG. 12, the level of the signal at the predetermined frequency supplied to the peripheral excitation coil 83 is controlled by the control code supplied from the control circuit of the position detection circuit.

In the example described above, the position indicator used in combination with the electromagnetic induction first sensor includes a resonance circuit (electromagnetic coupling circuit). The position indicator receives an electromagnetic induction signal from the first sensor, stores an amount of energy corresponding to the induced magnetic field in the resonance circuit and supplies the stored energy to the first sensor.

However, if the position indicator includes a battery as a drive source, and also includes an oscillator for supplying an electromagnetic induction signal to the first sensor, there is no need to supply an electromagnetic induction signal from the first sensor to the position indicator. The electromagnetic induction first sensor of the position detector according to the present invention may be an electromagnetic induction sensor that does not supply an electromagnetic induction signal to the position indicator.

In the above embodiments, a display device is provided between the first and second sensors. However, it is needless to say that the position detector according to the present invention may have the first and second sensors without a display device.

Figure 13:
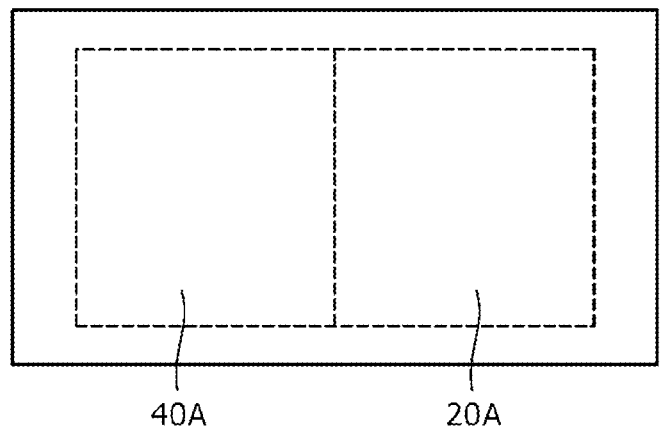
FIG. 13 is a diagram for describing another example of arrangement of the first and second sensors incorporated in the position detector according to the present invention.
Figure 14:
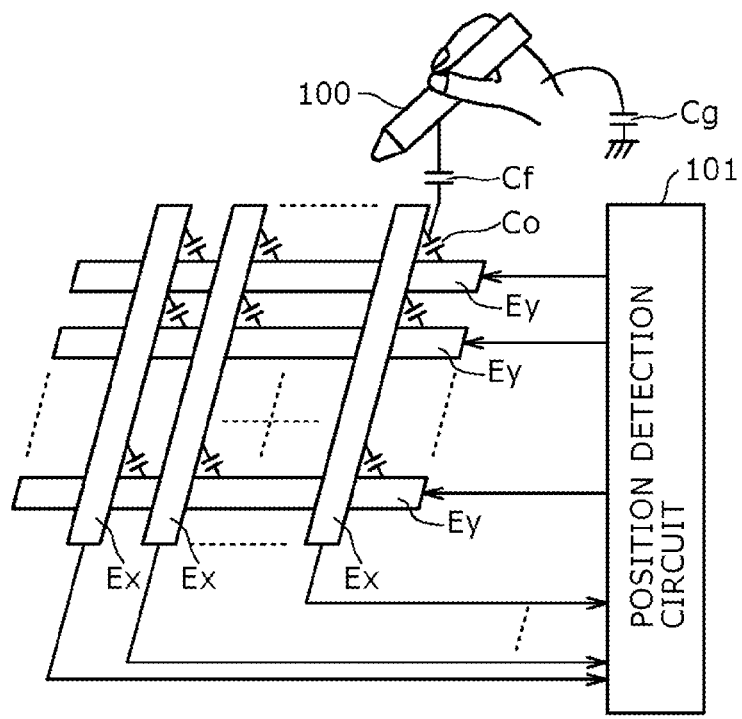
FIG. 14 is a diagram for describing a capacitive sensor.

Further, in the above embodiments, the first and second sensors are arranged in such a manner that their detection areas overlap. However, the present invention is not limited to such an overlapping arrangement. Instead, the present invention is applicable when the first and second sensors are arranged in such a manner that their detection areas partially overlap, or when the first and second sensors are arranged in proximity to each other. That is, for example, even when a first sensor 20A and second sensor 40A are arranged horizontally adjacent to each other as shown in FIG. 13, the position detection output of the first sensor may be adversely affected by the transmission signal supplied to the second sensor in the area where the two sensors are in proximity to each other. Therefore, the present invention is also applicable to such an arrangement as the one shown in the example of FIG. 13.

It should be noted that, in the above embodiments, the indicator presence/absence signals Dm and Dc indicating whether the first and second indicators are detected by the first and second sensors 20 and 40, respectively, are generated depending on whether the coordinates of the positions indicated by the first and second indicators have been calculated. The position indication state determination circuits determine the position indication state of the first and second indicators from the indicator presence/absence signals Dm and Dc. However, whether the first and second indicators are detected by the first and second sensors 20 and 40, respectively, can be determined by monitoring the output signals from the first and second sensors 20 and 40. Therefore, the position indication state determination circuits may determine the position indication state from indicator presence/absence signals based on the output signals of the first and second sensors 20 and 40 instead of the indicator presence/absence signals Dm and Dc generated based on whether the coordinates have been calculated as described above.

Further, it was described above that the indicator presence/absence signals are generated for the first and second indicators, and the position indication state determination circuits determine the position indication state based on the indicator presence/absence signals. However, the position indication state determination circuits may determine the position indication state based on the coordinate outputs of the position detection circuits for the first and second sensors 20 and 40 or based on the sensor outputs of the first and second sensors 20 and 40 without generating the indicator presence/absence signals.

It should be noted that, although a capacitive sensor was taken as an example of a second sensor based on a detection method other than electromagnetic induction in the above embodiments, the second sensor is not limited to a capacitive sensor. Instead, the present invention is applicable to all cases in which a transmission signal is supplied to the second sensor and the transmission signal adversely affects the detection result of the electromagnetic induction first sensor and position detection circuit.

Further, the electronic device to which the present invention is applied is not limited to the pad type terminal described above. Instead, the electronic device may be of any type so long as it includes first and second sensors and is capable of simultaneously detecting first and second indicators (e.g., tablet type personal computer or liquid crystal tablet).

The invention claimed is:

1. A position detector having a first sensor for detecting a position indicated by a first indicator through electromagnetic induction and a second sensor provided in proximity to the first sensor for detecting a position indicated by a second indicator through a detection method other than electromagnetic induction, to be capable of simultaneously detecting the positions indicated by the first and second indicators, the position detector comprising:
a signal supply circuit configured to supply a transmission signal used to detect the position indicated by the second indicator to the second sensor;
a position indication state determination circuit configured to receive two signals, one output from the first sensor according to the position indicated by the first indicator and the other output from the second sensor according to the position indicated by the second indicator, to determine the position indication state of the first and second indicators; and
a signal level control circuit configured to control the level of the transmission signal supplied from the signal supply circuit to the second sensor according to the determination result of the position indication state by the position indication state determination circuit, wherein
based on the position indication state determined by the position indication state determination circuit, if a transition occurs from a non-simultaneous state, in which one of the first and second indicators indicates a position non-simultaneously, to a simultaneous state in which both the first and second indicators indicate positions simultaneously with each other, the signal level control circuit supplies, to the second sensor, a transmission signal different in level from that supplied to the second sensor in the non-simultaneous state.

2. The position detector of claim 1, wherein
the non-simultaneous state, in which one of the first and second indicators indicates a position non-simultaneously, is a state in which the second indicator indicates a position, and when a transition occurs to the simultaneous state in which both the first and second indicators indicate positions simultaneously with each other, the signal level control circuit supplies, to the second sensor, a transmission signal set to a level lower than that supplied to the second sensor in the state in which the second indicator indicates a position.

3. The position detector of claim 1, wherein
the non-simultaneous state, in which one of the first and second indicators indicates a position non-simultaneously, is a state in which the first indicator indicates a position, and when a transition occurs to the simultaneous state in which both the first and second indicators indicate positions simultaneously with each other, the signal level control circuit supplies, to the second sensor, a transmission signal set to a level higher than that supplied to the second sensor in the state in which the first indicator indicates a position.

4. The position detector of claim 1, wherein
the first indicator includes a coil and the first sensor comprises an electromagnetic induction signal supply circuit for supplying an electromagnetic induction signal to the coil, and
the signal level control circuit controls the level of the electromagnetic induction signal supplied to the first indicator from the electromagnetic induction signal supply circuit according to the determination result of the position indication state by the position indication state determination circuit.

5. The position detector of claim 4, wherein
the electromagnetic induction signal supply circuit includes coils for supplying the electromagnetic induction signal to the coil of the first indicator.

6. The position detector of claim 1, wherein
the first and second sensors are arranged to overlap each other.

7. A position detection method using a first sensor for detecting a position indicated by a first indicator through electromagnetic induction and a second sensor provided in proximity to the first sensor for detecting a position indicated by a second indicator through a detection method other than electromagnetic induction, for simultaneously detecting the positions indicated by the first and second indicators, the position detection method comprising:
a signal supply step of supplying a transmission signal used to detect the position indicated by the second indicator to the second sensor;
a position indication state determination step of determining the position indication state of the first and second indicators by receiving two signals, one output from the first sensor according to the position indicated by the first indicator and the other output from the second sensor according to the position indicated by the second indicator; and
a signal level control step of controlling the level of the transmission signal supplied to the second sensor by the signal supply step according to the result of the determination of the position indication state by the position indication state determination step, wherein
based on the position indication state determined by the position indication state determination step, if a transition occurs from a non-simultaneous state, in which one of the first and second indicators indicates a position non-simultaneously, to a simultaneous state in which both the first and second indicators indicate positions simultaneously with each other, by the signal level control step, the second sensor is supplied with a transmission signal different in level from that supplied to the second sensor in the non-simultaneous state.

8. A position detector having a first sensor for detecting a position indicated by a first indicator through electromagnetic induction and a second sensor provided in proximity to the first sensor for detecting a position indicated by a second indicator through a detection method other than electromagnetic induction, to be capable of simultaneously detecting the positions indicated by the first and second indicators, the position detector comprising:
a first signal supply circuit configured to supply a first signal used to detect the position indicated by the first indicator to the first sensor;
a second signal supply circuit configured to supply a transmission signal used to detect the position indicated by the second indicator to the second sensor;
a position indication state determination circuit configured to receive two signals, one output from the first sensor according to the position indicated by the first indicator and the other output from the second sensor according to the position indicated by the second indicator, to determine the position indication state of the first and second indicators; and
a signal level control circuit configured to control at least one of the level of the first signal supplied to the first sensor and the level of the transmission signal supplied to the second sensor, according to the determination result of the position indication state by the position indication state determination circuit, wherein
based on the position indication state determined by the position indication state determination circuit, if a transition occurs from a non-simultaneous state, in which one of the first and second indicators indicates a position non-simultaneously, to a simultaneous state in which both the first and second indicators indicate positions simultaneously with each other, the signal level control circuit performs at least one of: (i) setting the level of the first signal supplied to the first sensor to be different from that supplied to the first sensor in the non-simultaneous state, and (ii) setting the level of the transmission signal supplied to the second sensor to be different from that supplied to the second sensor in the non-simultaneous state.

9. The position detector of claim 8, wherein
the non-simultaneous state, in which one of the first and second indicators indicates a position non-simultaneously, is a state in which the second indicator indicates a position, and when a transition occurs to the simultaneous state in which both the first and second indicators indicate positions simultaneously with each other, the signal level control circuit performs at least one of: (i-a) setting the level of the first signal supplied to the first sensor to be higher than that supplied to the first sensor in the non-simultaneous state, and (ii-a) setting the level of the transmission signal supplied to the second sensor to be lower than that supplied to the second sensor in the non-simultaneous state.

10. The position detector of claim 8, wherein
the non-simultaneous state, in which one of the first and second indicators indicates a position non-simultaneously, is a state in which the first indicator indicates a position, and when a transition occurs to the simultaneous state in which both the first and second indicators indicate positions simultaneously with each other, the signal level control circuit performs at least one of: (i-b) setting the level of the first signal supplied to the first sensor to be lower than that supplied to the first sensor in the non-simultaneous state, and (ii-b) setting the level of the transmission signal supplied to the second sensor to be higher than that supplied to the second sensor in the non-simultaneous state.

11. The position detector of claim 8, wherein
the signal level control circuit performs (i) setting the level of the first signal supplied to the first sensor to be different from that supplied to the first sensor in the non-simultaneous state, while maintaining the level of the transmission signal supplied to the second sensor at a fixed level.

12. The position detector of claim 8, wherein
the signal level control circuit performs (ii) setting the level of the transmission signal supplied to the second sensor to be different from that supplied to the second sensor in the non-simultaneous state, while maintaining the level of the first signal supplied to the first sensor at a fixed level.

13. The position detector of claim 8, wherein
the signal level control circuit performs both of: (i) setting the level of the first signal supplied to the first sensor to be different from that supplied to the first sensor in the non-simultaneous state, and (ii) setting the level of the transmission signal supplied to the second sensor to be different from that supplied to the second sensor in the non-simultaneous state.

14. The position detector of claim 8, wherein
the first indicator includes a coil and the first sensor comprises an electromagnetic induction signal supply circuit for supplying an electromagnetic induction signal to the coil, and the signal level control circuit controls the level of the first signal supplied to the first sensor to thereby control the level of the electromagnetic induction signal supplied from the electromagnetic induction signal supply circuit to the first indicator.

15. The position detector of claim 14, wherein
the electromagnetic induction signal supply circuit includes coils for supplying the electromagnetic induction signal to the coil of the first indicator.

* * * * *